United States Patent
de Wild et al.

(10) Patent No.: US 12,246,347 B2
(45) Date of Patent: Mar. 11, 2025

(54) CAPACITIVE MICRO-MACHINED ULTRASOUND TRANSDUCER (CMUT) DEVICES AND CONTROL METHODS

(71) Applicant: KONINKLIJKE PHILIPS N.V., Eindhoven (NL)

(72) Inventors: Nico Maris Adriaan de Wild, Eindhoven (NL); Marc Godfriedus Marie Notten, Eindhoven (NL); Antonia Cornelia van Rens, Nuenen (NL); Franciscus Hendrikus van Heesch, Valkenswaard (NL); Mckee Dunn Poland, Andover, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 357 days.

(21) Appl. No.: 16/636,949

(22) PCT Filed: Jul. 31, 2018

(86) PCT No.: PCT/EP2018/070642
§ 371 (c)(1),
(2) Date: Feb. 6, 2020

(87) PCT Pub. No.: WO2019/030045
PCT Pub. Date: Feb. 14, 2019

(65) Prior Publication Data
US 2020/0164405 A1    May 28, 2020

Related U.S. Application Data

(60) Provisional application No. 62/569,839, filed on Oct. 9, 2017, provisional application No. 62/542,484, filed on Aug. 8, 2017.

(30) Foreign Application Priority Data
Nov. 14, 2017   (EP) ..................... 17201544

(51) Int. Cl.
*B06B 1/02*    (2006.01)
*G01H 11/06*   (2006.01)
(Continued)

(52) U.S. Cl.
CPC .......... *B06B 1/0292* (2013.01); *B06B 1/0207* (2013.01); *G01H 11/06* (2013.01);
(Continued)

(58) Field of Classification Search
None
See application file for complete search history.

(56) References Cited

U.S. PATENT DOCUMENTS 5,097,709 A * 3/1992 Masuzawa ............ B06B 1/0629
                                                600/447
5,825,117 A   10/1998 Ossmann et al.
(Continued)

FOREIGN PATENT DOCUMENTS

CN    105413997 A    3/2016
EP    1671589 A1     6/2006
(Continued)

OTHER PUBLICATIONS

Oralkan, Omer, et al. "Experimental characterization of collapse-mode CMUT operation." IEEE transactions on ultrasonics, ferroelectrics, and frequency control 53.8 (2006): 1513-1523. (Year: 2006).*
(Continued)

*Primary Examiner* — Isam A Alsomiri
*Assistant Examiner* — Jonathan D Armstrong

(57) ABSTRACT

An ultrasound system has a set of CMUT transducer devices and drive electronics for operating a selected device of the set. The drive electronics is shared between all devices of the set. Selection is made by using a set of switches (178), with a respective switch between a DC bias output (166) of the
(Continued)

drive electronics and an associated input (160) of each device. This provides a simple way to provide a selection function between the drive electronics and multiple ultrasound devices. In this way, the number of devices may be scale up, to cover a larger area, but without scaling the cost of the system by the same degree.

18 Claims, 4 Drawing Sheets

(51) Int. Cl.
 *G01N 29/24* (2006.01)
 *G01S 15/89* (2006.01)
(52) U.S. Cl.
 CPC ...... *G01N 29/2406* (2013.01); *G01S 15/8906* (2013.01); *B06B 2201/51* (2013.01)

(56) References Cited

U.S. PATENT DOCUMENTS

| | | | | |
|---|---|---|---|---|
| 6,028,615 | A * | 2/2000 | Pletcher | B41J 2/395 347/127 |
| 6,074,346 | A | 6/2000 | Oppelt | |
| 6,381,197 | B1 | 4/2002 | Savord et al. | |
| 6,461,299 | B1 * | 10/2002 | Hossack | G01S 7/52017 600/443 |
| 6,499,348 | B1 * | 12/2002 | Mamayek | B06B 1/0292 73/632 |
| 6,540,677 | B1 * | 4/2003 | Angelsen | B06B 1/0215 367/121 |
| 6,826,961 | B2 * | 12/2004 | Mamayek | B06B 1/0292 73/632 |
| 8,315,125 | B2 * | 11/2012 | Lemmerhirt | G01H 11/06 318/116 |
| 8,946,972 | B2 | 2/2015 | Marshall et al. | |
| 10,613,058 | B2 * | 4/2020 | Zhao | G01N 29/262 |
| 2003/0048698 | A1 * | 3/2003 | Barnes | H04R 23/00 367/181 |
| 2003/0085635 | A1 * | 5/2003 | Davidsen | B06B 1/0607 310/334 |
| 2003/0149363 | A1 * | 8/2003 | Dreschel | B06B 1/00 600/437 |
| 2005/0094490 | A1 | 5/2005 | Thomenius et al. | |
| 2005/0124884 | A1 * | 6/2005 | Bolorforosh | A61B 8/4488 600/439 |
| 2006/0004289 | A1 * | 1/2006 | Tian | B06B 1/0292 600/459 |
| 2006/0064259 | A1 * | 3/2006 | Zeng | G01N 29/032 702/70 |
| 2006/0075818 | A1 * | 4/2006 | Huang | B06B 1/0292 73/649 |
| 2007/0013264 | A1 * | 1/2007 | Wilser | B06B 1/0292 310/311 |
| 2007/0016020 | A1 * | 1/2007 | Oshiki | B06B 1/0207 600/437 |
| 2007/0038082 | A1 * | 2/2007 | Mo | G01S 7/52038 600/459 |
| 2007/0079658 | A1 * | 4/2007 | Wagner | B06B 1/0207 600/437 |
| 2007/0083119 | A1 * | 4/2007 | Adachi | A61B 8/4483 600/437 |
| 2007/0164632 | A1 * | 7/2007 | Adachi | G01N 29/2437 310/311 |
| 2007/0167814 | A1 * | 7/2007 | Wakabayashi | A61B 8/445 600/459 |
| 2008/0027320 | A1 * | 1/2008 | Bolorforosh | B06B 1/0629 600/439 |
| 2010/0180673 | A1 * | 7/2010 | Cable | G01N 29/2406 73/64.53 |
| 2010/0237807 | A1 * | 9/2010 | Lemmerhirt | G01H 11/06 318/116 |
| 2012/0161819 | A1 | 6/2012 | Rossi et al. | |
| 2014/0211592 | A1 * | 7/2014 | Miyazawa | B06B 1/0215 367/135 |
| 2015/0018678 | A1 * | 1/2015 | Komuro | A61B 8/4461 320/136 |
| 2018/0015504 | A1 * | 1/2018 | Zhao | B06B 1/0207 |
| 2018/0071775 | A1 * | 3/2018 | Zhuang | B06B 1/0292 |
| 2018/0254716 | A1 | 9/2018 | Kandori et al. | |
| 2018/0376253 | A1 * | 12/2018 | Lutsky | B06B 1/0215 |
| 2019/0321000 | A1 * | 10/2019 | Takezaki | A61B 8/4444 |
| 2020/0346248 | A1 * | 11/2020 | Van Rens | G01S 7/52046 |

FOREIGN PATENT DOCUMENTS

| | | |
|---|---|---|
| EP | 1880677 A1 | 1/2008 |
| WO | 2010146838 A2 | 12/2010 |
| WO | 2011001391 A2 | 1/2011 |
| WO | 2011070729 A1 | 6/2011 |
| WO | 2015071387 A1 | 5/2015 |
| WO | 2016083273 A1 | 6/2016 |
| WO | 2016091624 A1 | 6/2016 |
| WO | 2017149421 A1 | 9/2017 |

OTHER PUBLICATIONS

International Search and Written Opinion for International Application No. PCT/EP2018/070642, filed Jul. 31, 2018, 15 pages.

Smith, H. et al., "Beam steering", retrieved from https://doi.org/10.53347/rID-68391, 2020, 1 page.

* cited by examiner

CAPACITIVE MICRO-MACHINED ULTRASOUND TRANSDUCER (CMUT) DEVICES AND CONTROL METHODS

RELATED APPLICATIONS

This application is the U.S. National Phase application under 35 U.S.C. § 371 of International Application No. PCT/EP2018/070642, filed on Jul. 31, 2018, which claims priority to and the benefit of Provisional Application Ser. No. 62/542,484, filed Aug. 8, 2017, and Provisional Application Ser. No. 62/569,839, filed Oct. 9, 2017, and European Application No. 17201544.8, filed Nov. 14, 2017. These applications are hereby incorporated by reference herein.

FIELD OF THE INVENTION

The present invention relates to capacitive micro-machined ultrasound transducers, CMUTs, for example for use in an ultrasound imaging system.

BACKGROUND OF THE INVENTION

Ultrasonic transducers used for medical imaging have numerous characteristics that lead to the production of high quality diagnostic images.

Traditionally, piezoelectric materials have been used for ultrasonic transducers. Examples are lead zirconate titanate (PZT) and polyvinylidene difluoride (PVDF) materials, with PZT being particularly popular as the material of choice. Single crystal piezoelectric materials are used to achieve high piezoelectric and electro-mechanical coupling constants for high performance transducers.

Recent developments have led to the prospect that medical ultrasound transducers can be batch manufactured by semiconductor processes. Desirably these processes should be the same ones used to produce the application specific integrated circuits (ASICs) needed by an ultrasound probe such as a CMOS process, particularly for 3D ultrasound. These developments have produced micro machined ultrasonic transducers or MUTs, the preferred form being the capacitive MUT (CMUT). CMUT transducers are tiny diaphragm-like devices with electrodes that convert the sound vibration of a received ultrasound signal into a modulated capacitance.

CMUT transducers in particular are able to function over a broad bandwidth, enable high resolution and high sensitivity imaging, and produce a large pressure output so that a large depth of field of acoustic signals can be received at ultrasonic frequencies.

For transmission, the capacitive charge applied to the electrodes is modulated to vibrate/move the diaphragm of the device and thereby transmit an ultrasound wave. Since these diaphragms are manufactured by semiconductor processes the devices generally can have dimensions in the 10-500 micrometer range, with the diaphragm diameter for instance being selected to match the diaphragm diameter to the desired resonance frequency (range) of the diaphragm, with spacing between the individual diaphragms less than a few micrometers. Many such individual CMUT cells can be connected together and operated in unison as a single transducer element. For example, four to sixteen CMUT cells can be coupled together to function in unison as a single transducer element. A typical 2D transducer array can have 2000-10000 CMUT transducer elements or cells by way of example.

The manufacture of CMUT transducer-based ultrasound systems is therefore more cost-effective compared to PZT-based systems. Moreover, due to the materials used in such semiconductor processes, the CMUT transducers exhibit much improved acoustic impedance matching to water and biological tissue, which obviates the need for (multiple) matching layers and yields an improved effective bandwidth.

In order to optimize the acoustic power (output pressure) produced by the CMUT cells, the CMUT cells may be operated in so-called collapse mode in which the CMUT cells are driven by a DC bias voltage that drives a central part of the diaphragm or flexible membrane across the gap onto the opposing substrate. The cells are provided with a stimulus signal having a set frequency that causes the diaphragm or flexible membrane to resonate at the set frequency. The DC voltage at which the membrane goes into collapse is called the collapse voltage, $V_C$.

Ultrasound imaging may be desired for imaging a large area of the body, for example for tracking the movement of a catheter along an artery. It is not practical to form a conventional design of ultrasound transducer array of such a size, in particular as a result of the amount of data that needs to be processed from such a large array.

The conventional solution is to provide a portable hand held ultrasound probe which is moved over an area of interest. Image reconstruction can be used to stitch images together. This results in a more complicated imaging procedure for the sonographer.

It would therefore be desirable to enable imaging of a large area field of view without requiring movement of a hand held probe, but with a limited additional complexity and cost of the imaging device.

WO 2017/149421 discloses a CMUT transducer array in which different bias voltages may be applied to different aperture regions of the array, such that high frequency selectivity is operated in the near field and low frequency selectivity is operated in the far field.

SUMMARY OF THE INVENTION

The invention is defined by the claims.

According to examples in accordance with an aspect of the invention, there is provided an ultrasound system, comprising:
  a set of ultrasound transducer devices, each device comprising one or more capacitive micro-machined ultrasound transducer, CMUT, cells, and each device comprising a first input for receiving a DC bias and a second input for receiving an AC drive signal, wherein each ultrasound transducer device is associated with a different area to be imaged or treated such that the set of ultrasound devices is associated with a larger area than each individual device;
  drive electronics for operating a selected device of the set, wherein the drive electronics is shared between all devices of the set, wherein the drive electronics comprises a first output for delivering the DC bias voltage and a second output for delivering the AC drive signal; and
  a selector for selecting which device of the set is coupled to the bias voltage,
  wherein the selector comprises a set of switches, with a respective switch between the first output of the drive electronics and the first input of each device such that the DC bias voltage is coupled only to the selected device and the DC bias voltage is isolated from the non-selected devices of the set, wherein the same bias voltage is applied to each device of the set when the device is selected.

This system makes use of multiple US transducer devices, but they share drive electronics. In this way, a large area ultrasound system may be formed instead of moving a smaller hand held ultrasound probe over an area. The multiple devices are multiplexed to the drive electronics by making use of a DC bias electrode of each device. By disconnecting the DC bias voltage from the DC bias electrode, an ultrasound device is left floating and it therefore does not influence the operation of the selected devices of the set. The drive electronics is for driving and reading out the CMUT cells of the selected set.

The non-biased devices will add to parasitic capacitances, but the capacitance is lower as the CMUT cells are not in collapse. Due to the parasitic capacitance effects there is however a limit on the number of CMUT cells that can be connected.

This approach is for example particularly suitable for devices which comprise CMUT cells operated in collapsed mode, for which the DC bias controls the collapse.

Each device preferably comprises an array of CMUT cells. The selection of a CMUT array may for example be used to change an aperture within the array, for example to focus more in a particular direction.

When each device comprises an array of CMUT cells, each device may comprise a fully functional ultrasound transducer device, but with drive and read out electronics which is shared between multiple such devices. Each device for example comprises 128 lines of CMUT cells (e.g. at least 64 lines), with 20 to 40 CMUT cells in each line (e.g. at least 10 in each line). There may be a square array of 128×128 CMUT cells.

There may be between 2 and 10 such devices, for example 4 devices. There may be at least 4 device, or at least 6 devices or at least 8 devices.

The or each CMUT cell of each device for example comprises:
a substrate;
a first electrode connected to the substrate formed around a central axis;
a flexible membrane, wherein the flexible membrane is spatially separated from the first electrode; and
a second electrode connected to the flexible membrane, wherein the second electrode is concentric with the first electrode;

This defines an electrode layout for a collapsible CMUT cell.

The drive electronics for example comprises:
a voltage supply which is adapted to:
provide the DC bias voltage to the first electrode; and
provide the AC drive signal to the second electrode of the CMUT cell; and
a capacitance sensing circuit.

The capacitance sensing circuit is used to measure a variation in the cell's capacitance as the response of the cell to an incident ultrasound stimulus and thereby enable ultrasound imaging. The ultrasound system for example comprises an imaging system. However, the same approach may be applied to an ultrasound system which is only for delivering therapy.

The invention also provides an ultrasound imaging method, comprising:
selecting one ultrasound transducer device of a set of ultrasound transducer devices, wherein each ultrasound transducer device is associated with a different area to be imaged or treated such that the set of ultrasound devices is associated with a larger area than each individual device;
operating the selected device using drive electronics which delivers a DC bias voltage and an AC drive signal,
wherein the selecting comprises switching the DC bias voltage only to the selected device and isolating the DC bias voltage from the non-selected devices of the set, wherein the same bias voltage is applied to each device of the set when the device is selected.

Each device for example comprises one or more capacitive micro-machined ultrasound transducer, CMUT, cells, and each device comprises a first input for receiving the DC bias and a second input for receiving the AC drive signal;

The method may then comprise operating the or each CMUT cell of each device in a collapsed mode.

It shall be understood by the skilled person that in the context of the present application, when referring to different areas to be imaged, term imaging shall be understood in a broader context of ultrasound data acquisition from said areas, which shall also include an ultrasound data acquisition, wherein physiological properties of said area are being assessed (investigated or treated) by an ultrasound system without an image reconstruction step.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
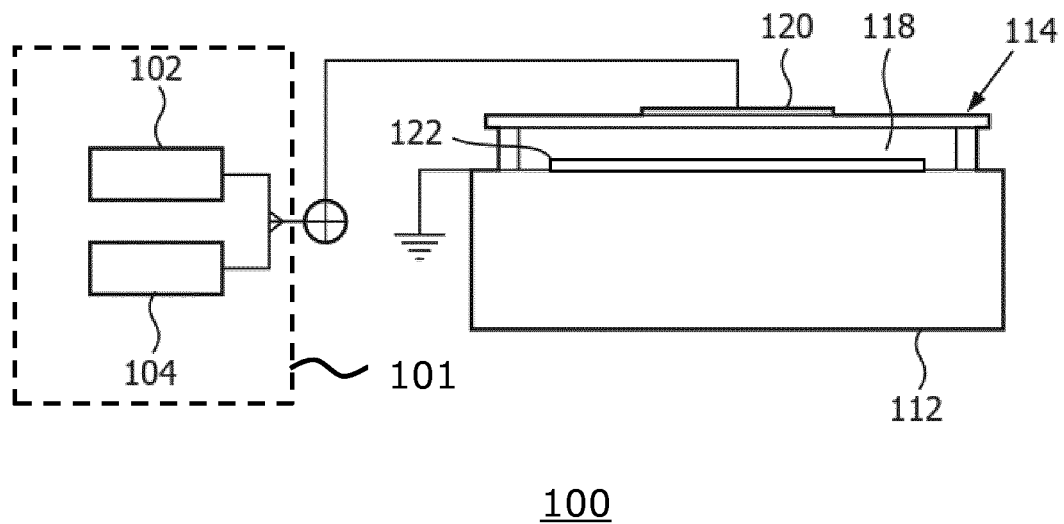
FIG. 1 schematically depicts a typical CMUT cell of an ultrasound system operable in a collapsed mode.

It should be understood that the Figures are merely schematic and are not drawn to scale. It should also be understood that the same reference numerals are used throughout the Figures to indicate the same or similar parts.

The invention provides an ultrasound system having a set of CMUT transducer devices and drive electronics for operating a selected device of the set. The drive electronics is shared between all devices of the set. Selection is made by using a set of switches, with a respective switch between a DC bias output of the drive electronics and an associated input of each device. This provides a simple way to provide a selection function between the drive electronics and multiple ultrasound devices. In this way, the number of devices may be scaled up, to cover a larger area, but without scaling the cost of the system by the same degree. In this way, a static system may be formed instead of requiring movement of a hand held probe. This makes the use of the system easier. Different devices are employed when different areas are to be imaged (or treated) for example when tracking the movement of an implanted object such as a catheter using ultrasound imaging.

The different areas associated with the different transducer devices (i.e. areas to be treated or imaged) thus preferably comprise adjacent areas in an overall area to be imaged. Thus, each ultrasound transducer device is associated with a different area to be imaged or treated such that the set of ultrasound devices is associated with a larger area than each individual device. The same bias voltage is applied to each device of the set (i.e. to the drive terminal of the CMUT cells) when the device is selected. In other words, the different devices of the set are operated in the same way. They may be identical devices, forming a tiled array of devices wherein any individual device within the tiled array may be selected and operated with a common set of drive signals.

FIG. 1 shows a known design of CMUT cell 100 for use in an ultrasound system. The CMUT cell 100 comprises a flexible membrane or diaphragm 114 suspended above a silicon substrate 112 with a gap or cavity 118 there between. A first electrode 122 is located on the floor of the cell on the upper surface of the substrate 112 in this example. A second electrode 120 is located on the diaphragm 114 and moves with the diaphragm. In the example shown, the two electrodes are circular.

A dielectric (not shown) is provided on the substrate 112 and underneath the top (second) electrode 120. These two dielectrics may be equal in composition and thickness, but may be also asymmetric (different materials and thicknesses).

The membrane layer 114 is fixed relative to the top face of the substrate layer 112 and configured and dimensioned so as to define a spherical or cylindrical cavity 118 between the membrane layer 114 and the substrate layer 112.

Other realizations of the electrode 120 design can be considered, such as electrode 120 may be embedded in the membrane 114 or it may be deposited on the membrane 114 as an additional layer. In this example, the first electrode 122 is circularly configured and embedded in the substrate layer 112 by way of non-limiting example. Other suitable arrangements are possible, such as other electrode shapes and other locations of the first electrode 122. The first electrode may be directly exposed to the gap 118 or separated from the gap 118 by an electrically insulating layer or film to prevent a short-circuit between the second electrode 120 and the first electrode 122.

In FIG. 1 the first electrode 122 is grounded by way of non-limiting example. Other arrangements, e.g. a grounded second electrode 120 or both second electrode 120 and first electrode 122 floating are of course equally feasible.

The cell 100 and its gap 118 may exhibit alternative geometries. For example, cavity 118 could exhibit a rectangular or square cross-section, a hexagonal cross-section, an elliptical cross-section, or an irregular cross-section. Herein, reference to the diameter of the CMUT cell 100 shall be understood as the biggest lateral dimension of the cell. In FIG. 1, the diameter of the cylindrical cavity 118 is larger than the diameter of the circularly configured electrode plate 122. Electrode 120 may have the same outer diameter as the circularly configured electrode plate 122, although such conformance is not required and FIG. 1 shows a larger electrode plate 122.

The electrodes of the CMUT cell 100 provide the capacitive plates of the device and the gap 118 is the dielectric between the plates of the capacitor. When the diaphragm vibrates, the changing dimension of the dielectric gap between the plates provides a changing capacitance which is sensed as the response of the CMUT cell 100 to a received acoustic echo.

The spacing between the electrodes is controlled by applying a static voltage, e.g. a DC bias voltage, to the electrodes with a voltage supply 101. The voltage supply 101 may optionally comprise separate stages 102, 104 for providing the DC and AC or stimulus components respectively of the drive voltage of the CMUT cells 100, e.g. in transmission mode. The first stage 102 may be adapted to generate the static (DC) voltage component and the second stage 104 may be adapted to generate an alternating variable drive or stimulus voltage component having a set alternating frequency, which signal typically is the difference between the overall drive voltage and the aforementioned static component thereof.

The static or bias component of the applied drive voltage preferably meets or exceeds the threshold voltage for forcing the CMUT cell 100 into its collapsed state. This has the advantage that the first stage 102 may include relatively large capacitors, e.g. smoothing capacitors, in order to generate a particularly low-noise static component of the overall voltage, which static component typically dominates the overall voltage such that the noise characteristics of the overall voltage signal will be dominated by the noise characteristics of this static component.

Other suitable embodiments of the voltage source supply 101 should be apparent, such as for instance an embodiment in which the voltage source supply 101 contains three discrete stages including a first stage for generating the static DC component of the CMUT drive voltage, a second stage for generating the variable but DC component of the drive voltage and a third stage for generating the frequency modulation or stimulus component of the signal, e.g. a pulse circuit or the like. It is summarized that the voltage source supply 101 may be implemented in any suitable manner.

It is known that by applying a static voltage above a certain threshold, the CMUT cell 100 is forced into a collapsed state in which the membrane 114 collapses onto the substrate 112. This threshold value may depend on the exact design of the CMUT cell 100 and is defined as the DC bias voltage, known as the collapse voltage, at which the membrane 114 sticks to (contacts) the cell floor through the force due to the electric field between the electrodes. The amount (area) of contact between the membrane 114 and the substrate 112 is dependent on the applied bias voltage.

Increasing the contact area between the membrane 114 and the substrate 112 increases the resonant frequency of the membrane 114, as will be explained in more detail with the aid of FIG. 2a and FIG. 3a.

The frequency response of a collapsed mode CMUT cell 100 may be varied by adjusting the DC bias voltage applied to the CMUT electrodes after collapse. As a result, the resonant frequency of the CMUT cell increases as a higher DC bias voltage is applied to the electrodes.

Figure 2A:
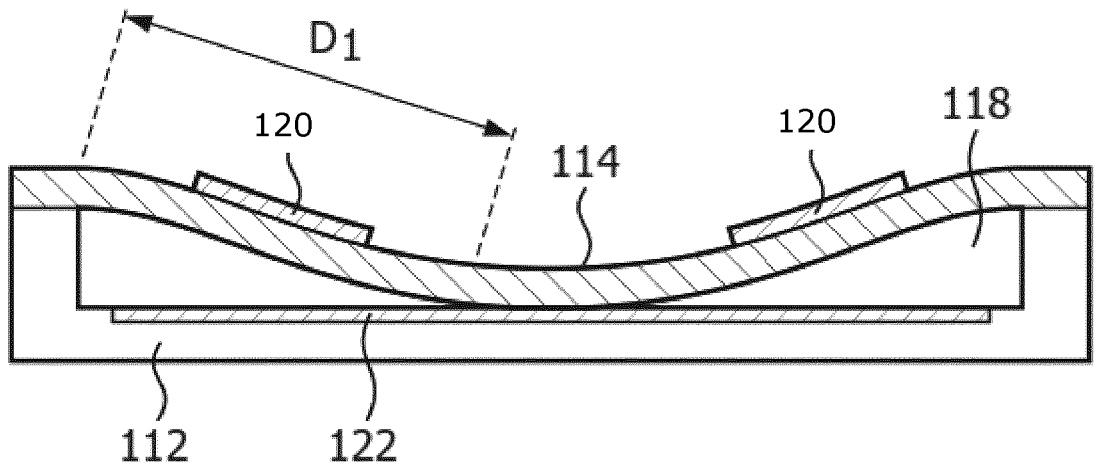
FIGS. 2a, 2b, 3a and 3b depict operating principles of such a CMUT cell.
Figure 2B:
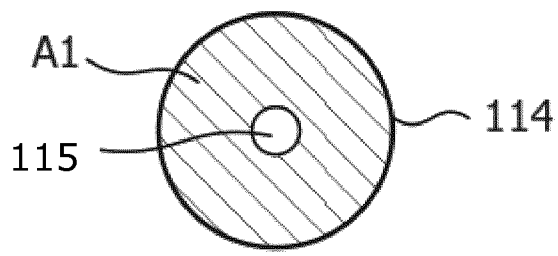
Figure 3A:
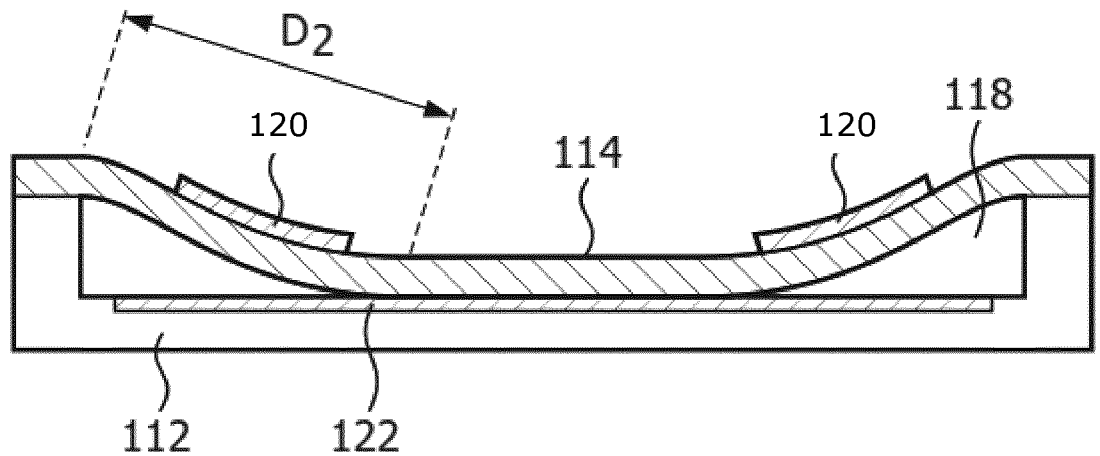

The principles behind this phenomenon are illustrated in FIGS. 2a, 2b, 3a and 3b. The cross-sectional views of FIGS. 2a and 3a illustrate this one-dimensionally by the distances D1 and D2 between the outer support of the membrane 114 and the point where the membrane begins to touch the floor of the cavity 118 in each illustration. It can be seen that the distance D1 is a relatively long distance in FIG. 2a when a relatively low bias voltage is applied, whereas the distance D2 in FIG. 3a is a much shorter distance due to a higher bias voltage being applied. These distances can be compared to long and short strings which are held by the ends and then plucked. The long, relaxed string will vibrate at a much lower frequency when plucked than will the shorter, tighter string. Analogously, the resonant frequency of the CMUT cell in FIG. 2a will be lower than the resonant frequency of the CMUT cell in FIG. 3a which is subject to the higher bias voltage.

Figure 3B:
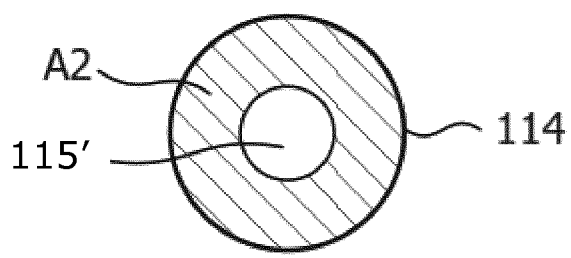

The phenomenon can also be appreciated from the two-dimensional illustrations of FIGS. 2b and 3b, which vary as a function of the effective operating area of the CMUT membrane. When the membrane 114 just touches the floor of the CMUT cell as shown in FIG. 2a, the effective vibrating area A1 of the non-contacting (free vibrating) portion of the cell membrane 114 is large as shown in FIG. 2b. The small area 115 in the center represents the center contact region of the membrane. The large area membrane will vibrate at a relatively low frequency. This area 115 is an area of the membrane 114 which is collapsed to the floor of the CMUT cell. When the membrane is pulled into deeper collapse by a higher bias voltage as in FIG. 3a, the larger central contact area 115' results in a smaller free vibrating area A2 as shown in FIG. 3b. This lesser area A2 will vibrate at a higher frequency than the larger A1 area. Thus, as the DC bias voltage is decreased the frequency response of the collapsed CMUT cell decreases, and when the DC bias voltage increases the frequency response of the collapsed CMUT cell increases.

Figure 4:
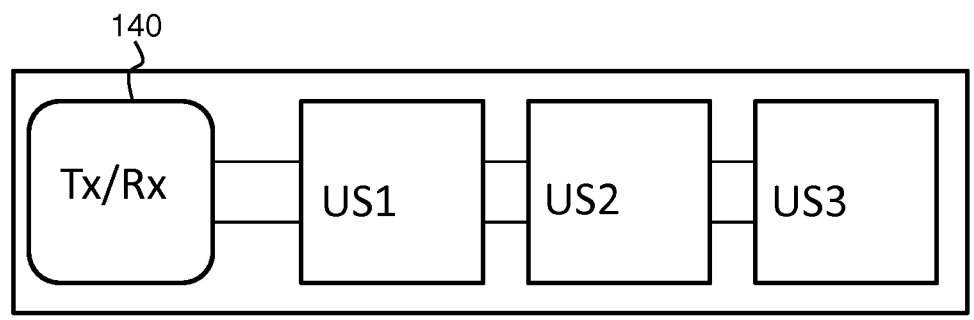
FIG. 4 shows schematically a desired combination of ultrasound transducer cells with share drive circuitry.

FIG. 4 shows a desired configuration of an ultrasound system in order to enable the system to be scaled to larger sizes.

Drive electronics 140 is associated with a set of three ultrasound devices, US1, US2, US3. The overall system for example comprises an ultrasound patch, and is then a wearable ultrasound device. Such a device may for example be used for catheter or needle tip (or other device) tracking and other real-time image guidance procedures. Such large area approaches may also be used for cardiac applications, and lung and bladder monitoring.

It is possible to build this multiplexed configuration with PZT transducer cells, but this results in complex solutions.

Figure 5:
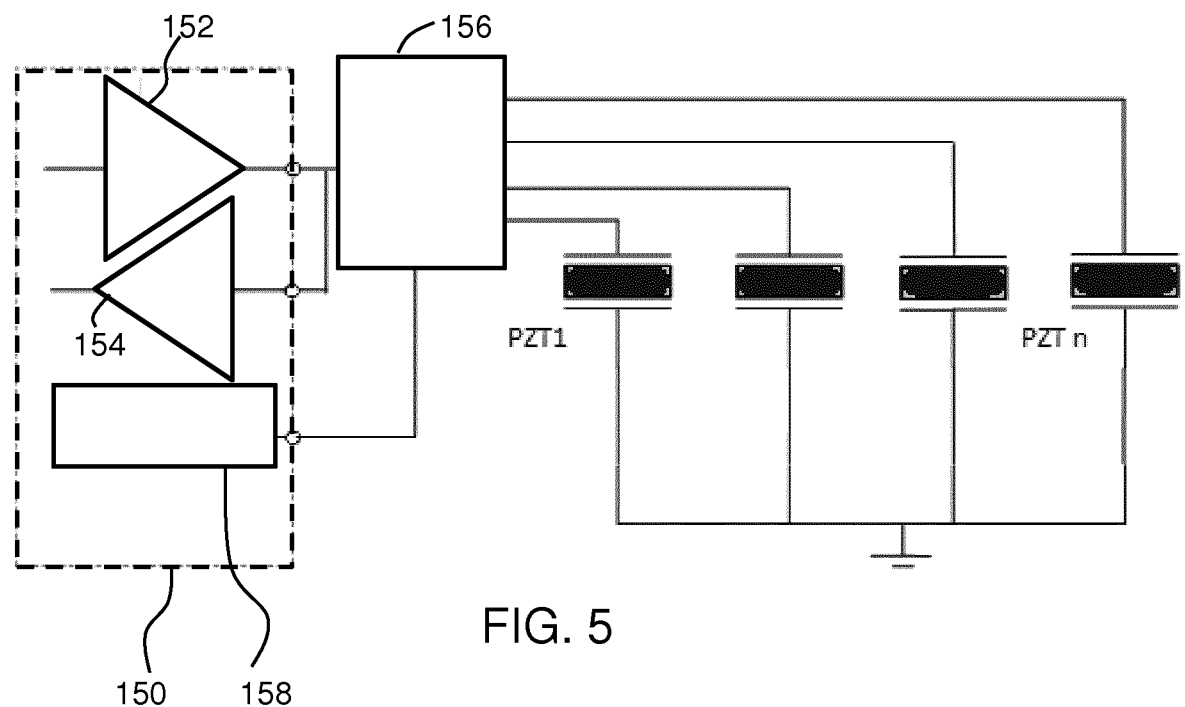
FIG. 5 shows how the combination of FIG. 4 could be achieved with PZT ultrasound transducers.

FIG. 5 shows a possible implementation for selecting a specific PZT transducer device from an array of PZT devices. The array comprises PZT devices PZT1 to PZTn.

The drive electronics 150 generally comprises transmit circuitry 152 and receive circuitry 154. A multiplexer 156 is provided between the electronics and the set of PZT devices, and it is controlled by an input from a selection circuit 158.

This example shows that with a multiplexer the desired PZT device can be selected by means of a selection signal from the electronic back-end. This is however a complex way of selecting the transducer. Timing of the signals is very critical between the transmit signal towards the transducer, the return echo (depending on the distance from transducer to object) signal from the transducer and the selection signal towards the multiplexer.

This configuration requires a continuous alignment between these signals in order to avoid affecting the return signal and influencing the ultrasound image. For a static object, where the distance between the transducer and object is more or less constant, the timing is less sensitive because the delay is more or less constant. Moving objects, like implanted devices, show a continuously changing distance and delay which increases the need for continuous alignment between all the signals present in the system.

In addition to the problem that timing of the signals is complex, the presence of the multiplexer in the signal path introduces an extra load, which affects the overall system performance and limits for example the frequency band-width and speed of the system. This can for example affect the time resolution of the system and therefore the acoustic properties of the transducer.

The multiplexer circuitry also draws power which is often unwanted for medical devices (catheters, mobile ultrasound probes, wearable ultrasound devices) where battery power is critical.

Figure 6:
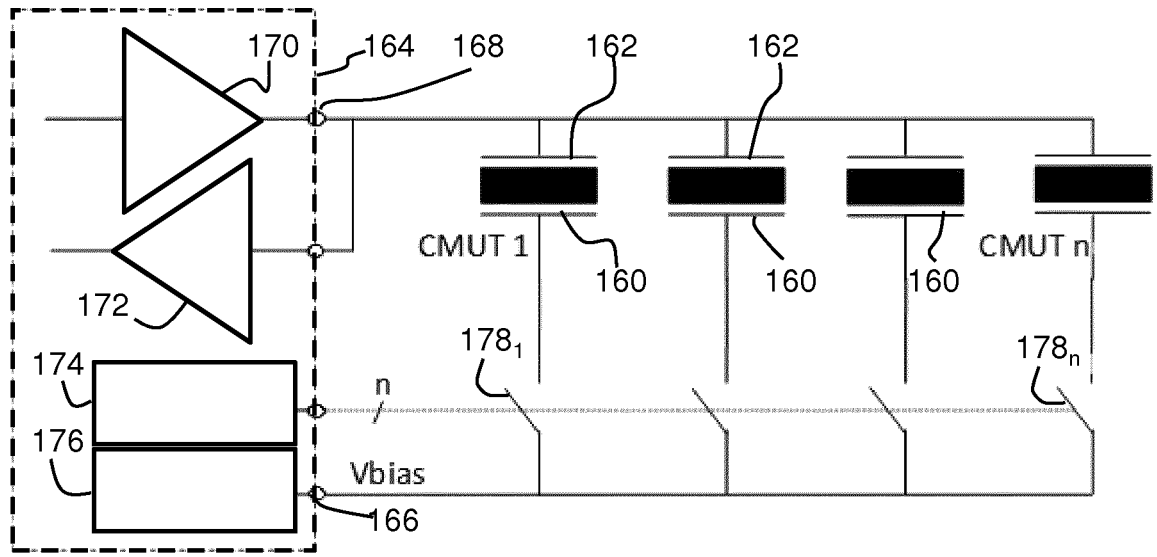
FIG. 6 shows how the combination of FIG. 4 is achieved in accordance with the invention with CMUT transducers.

FIG. 6 shows a device in accordance with the invention in which the general approach of FIG. 4 is implemented for CMUT devices CMUT1 to CMUTn. Each CMUT device comprises an array of capacitive micro-machined ultrasound transducer, CMUT, cells. Each device comprises a first input 160 for receiving a DC bias and a second input 162 for receiving an AC (RF) drive signal.

Each device is for example formed as a separate transducer array on a separate substrate.

The drive electronics 164 comprises a first output 166 for delivering the DC bias voltage and a second output 168 for delivering the AC drive signal. The drive electronics again comprise transmit circuitry 170 and receive circuitry 172 and a DC bias generator 174.

Each device is typically a CMUT array. Thus, there will be a bus of connectors forming the second output 168 with a connection to each individual CMUT cell. Similarly, each CMUT cell has a connection to the bias output 166. All cells are connected to the same bias voltage from the single supply.

A selector is provided for selecting which device of the set is coupled to the bias voltage of the drive electronics.

The same bias voltage is provided to the first input 160 of each device (i.e. to the CMUT cells of the device) when that device is selected. Thus, each device of the set operates with the same bias voltage. The different devices thus operate with a same set of drive signals.

Only one device from the full set has a bias voltage applied at any time. During that time, no other device has any bias voltage applied.

The selector comprises a circuit 176 for generating a set of switching signals and a set of switches $178_1$ to $178_n$, with a respective switch between the first output 166 of the drive electronics and the first input 160 of each device. The selector thus performs a multiplexing function by disconnecting non-selected CMUT devices.

The selection criteria as to which CMUT device should be active can be based on an algorithm, a guidance protocol or image recognition and automation.

The switches 178 are passive switches and consume near zero power in order to select the desired CMUT device, and without affecting the signal path and without an increase in interconnect complexity. In particular, there is no complex circuitry in the signal path, and the generation of the switch control signals takes place in the drive electronics without interfering with the signal path.

The switches 178 are used to select the bias voltage. The RF signal is attached to the other electrode of the CMUT cell so signal and image quality is not affected by adding the switch.

As mentioned above, each device comprises an array of CMUT cells. Each device may comprises a full CMUT array for example a 128 line 2D array of CMUT cells, although any other size of array is equally possible. There may be 2 to 10 CMUT devices, or even more than 10. The issue of parasitic capacitance and other electrical signal quality requirements determines the maximum number of devices that will be connected.

For example, the number of CMUT devices that may be used depends on the load on the driving electronics and on the influence of the non-active CMUT devices on the active CMUT devices in the array.

This approach makes use of the bias voltage of the CMUT cells in a device to select the CMUT device of interest without affecting the signal path, increasing interconnect and timing complexity and by selecting via a passive low or zero power switch.

A switching signal is generated by the circuit 170 at the electronic back-end to select the CMUT(s) of interest. The selection criteria can be controlled based on for example guidance procedure protocols, tracking algorithms or automated recognition patterns on the ultrasound image.

Figure 7:
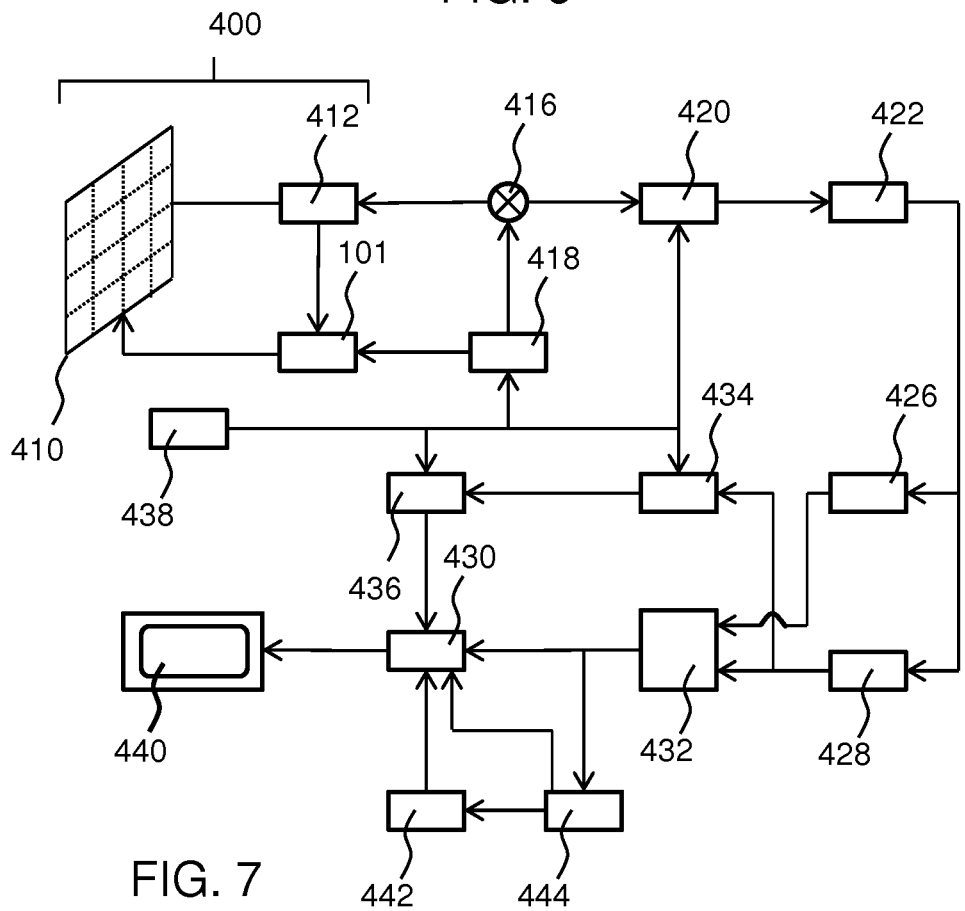
FIG. 7 schematically depicts an example embodiment of an ultrasound diagnostic imaging system which can make use of the multiplexing approach of the invention.

The number of CMUT selection signals (shown as n in FIG. 6) depends on the number of CMUT devices in the array. These signals are used to drive a passive switch usually with logic signals ("0"/"1") which are typically voltages around 0V and 1.8V. These digital signals show less susceptibility to parasitic interconnect properties (capacitance and inductance) which reduces a potential influence on the timing of the switching signals. The general operation of the CMUT system including its drive electronics can be standard and is not described in detail. However, for completeness. FIG. 7 shows an ultrasonic diagnostic imaging system with an array transducer probe 400 according to an example in block diagram form.

In FIG. 7 an ultrasound system 400 is shown which may form one of the devices of the set. It comprises CMUT cells as discussed above for transmitting ultrasonic waves and receiving echo information. The transducer array 410 of the system 400 may be a one- or a two-dimensional array of transducer elements capable of scanning in a 2D plane or in three dimensions for 3D imaging.

The transducer array 410 can comprise the set of ultrasound transducer devices (such as US1, US2, US3 for example) arranged next to each other in one direction, wherein each device comprises the first input for receiving the DC bias and the second input for receiving the AC drive signal. This transducer array can be arranged to be placed externally on the body or to be placed internally within the body in the latter case as a part of an interventional apparatus for in-vivo applications.

The transducer array 410 is coupled to a micro-beamformer 412 which controls transmission and reception of signals by the CMUT array cells. Micro-beamformers are capable of at least partial beam forming of the signals received by groups or "patches" of transducer elements for instance as described in US patents U.S. Pat. No. 5,997,479 (Savord et al.), U.S. Pat. No. 6,013,032 (Savord), and U.S. Pat. No. 6,623,432 (Powers et al.).

The micro-beamformer 412 is coupled by the probe cable, e.g. coaxial wire, to a transmit/receive (T/R) switch 416 which switches between transmission and reception modes and protects the main beam former 420 from high energy transmit signals when a micro-beamformer is not present or used and the transducer array 410 is operated directly by the main system beam former 420. The transmission of ultrasonic beams from the transducer array 410 under control of the micro-beamformer 412 is directed by a transducer controller 418 coupled to the micro-beamformer by the T/R switch 416 and the main system beam former 420, which receives input from the user's operation of the user interface or control panel 438. One of the functions controlled by the transducer controller 418 is the direction in which beams are steered and focused. Beams may be steered straight ahead from (orthogonal to) the transducer array 410, or at different angles for a wider field of view. The transducer controller 418 may be coupled to control the aforementioned voltage source 101 for the CMUT array. For instance, the voltage source 101 sets the DC and AC bias voltage(s) that are applied to the CMUT cells of a CMUT array 410, e.g. to generate the ultrasonic RF pulses in transmission mode as explained above. In this embodiment the drive electronics 164 may be integrated in the transducer controller 418 of the ultrasound system.

The partially beam-formed signals produced by the micro-beamformer 412 are forwarded to the main beam former 420 where partially beam-formed signals from individual patches of transducer elements are combined into a fully beam-formed signal. For example, the main beam former 420 may have 128 channels, each of which receives a partially beam-formed signal from a patch of dozens or hundreds of CMUT transducer cells 100. In this way the signals received by thousands of transducer elements of a transducer array 410 can contribute efficiently to a single beam-formed signal.

The beam-formed signals are coupled to a signal processor 422. The signal processor 422 can process the received echo signals in various ways, such as bandpass filtering, decimation, I and Q component separation, and harmonic signal separation which acts to separate linear and nonlinear signals so as to enable the identification of nonlinear (higher harmonics of the fundamental frequency) echo signals returned from tissue and microbubbles.

The signal processor 422 optionally may perform additional signal enhancement such as speckle reduction, signal compounding, and noise elimination. The bandpass filter in the signal processor 422 may be a tracking filter, with its passband sliding from a higher frequency band to a lower frequency band as echo signals are received from increasing depths, thereby rejecting the noise at higher frequencies from greater depths where these frequencies are devoid of anatomical information.

The processed signals are coupled to a B-mode processor 426 and optionally to a Doppler processor 428. The B-mode processor 426 employs detection of an amplitude of the received ultrasound signal for the imaging of structures in the body such as the tissue of organs and vessels in the body. B-mode images of structure of the body may be formed in either the harmonic image mode or the fundamental image mode or a combination of both for instance as described in US Patents U.S. Pat. No. 6,283,919 (Roundhill et al.) and U.S. Pat. No. 6,458,083 (Jago et al.)

The Doppler processor 428, if present, processes temporally distinct signals from tissue movement and blood flow for the detection of the motion of substances, such as the flow of blood cells in the image field. The Doppler processor typically includes a wall filter with parameters which may be set to pass and/or reject echoes returned from selected types of materials in the body. For instance, the wall filter can be set to have a passband characteristic which passes signal of relatively low amplitude from higher velocity materials while rejecting relatively strong signals from lower or zero velocity material.

This passband characteristic will pass signals from flowing blood while rejecting signals from nearby stationary or slowing moving objects such as the wall of the heart. An inverse characteristic would pass signals from moving tissue of the heart while rejecting blood flow signals for what is referred to as tissue Doppler imaging, detecting and depicting the motion of tissue. The Doppler processor receives and processes a sequence of temporally discrete echo signals from different points in an image field, the sequence of echoes from a particular point referred to as an ensemble. An ensemble of echoes received in rapid succession over a relatively short interval can be used to estimate the Doppler shift frequency of flowing blood, with the correspondence of the Doppler frequency to velocity indicating the blood flow velocity. An ensemble of echoes received over a longer period of time is used to estimate the velocity of slower flowing blood or slowly moving tissue.

The structural and motion signals produced by the B-mode (and Doppler) processor(s) are coupled to a scan converter 432 and a multiplanar reformatter 444. The scan converter 432 arranges the echo signals in the spatial relationship from which they were received in a desired image format. For instance, the scan converter may arrange the echo signal into a two dimensional (2D) sector-shaped format, or a pyramidal three dimensional (3D) image.

The scan converter can overlay a B-mode structural image with colors corresponding to motion at points in the image field with their Doppler-estimated velocities to produce a color Doppler image which depicts the motion of tissue and blood flow in the image field. The multiplanar reformatter 444 will convert echoes which are received from points in a common plane in a volumetric region of the body into an ultrasonic image of that plane, for instance as described in US Patent U.S. Pat. No. 6,443,896 (Detmer). A volume renderer 442 converts the echo signals of a 3D data set into a projected 3D image as viewed from a given reference point as described in U.S. Pat. No. 6,530,885 (Entrekin et al.)

The 2D or 3D images are coupled from the scan converter 432, multiplanar reformatter 444, and volume renderer 442 to an image processor 430 for further enhancement, buffering and temporary storage for display on an image display 440. In addition to being used for imaging, the blood flow values produced by the Doppler processor 428 and tissue structure information produced by the B-mode processor 426 are coupled to a quantification processor 434. The quantification processor produces measures of different flow conditions such as the volume rate of blood flow as well as structural measurements such as the sizes of organs and gestational age. The quantification processor may receive input from the user control panel 438, such as the point in the anatomy of an image where a measurement is to be made.

Output data from the quantification processor is coupled to a graphics processor 436 for the reproduction of measurement graphics and values with the image on the display 440. The graphics processor 436 can also generate graphic overlays for display with the ultrasound images. These graphic overlays can contain standard identifying information such as patient name, date and time of the image, imaging parameters, and the like. For these purposes the graphics processor receives input from the user interface 438, such as patient name.

The user interface is also coupled to the transmit controller 418 to control the generation of ultrasound signals from the transducer array 410 and hence the images produced by the transducer array and the ultrasound system. The user interface is also coupled to the multiplanar reformatter 444 for selection and control of the planes of multiple multiplanar reformatted (MPR) images which may be used to perform quantified measures in the image field of the MPR images.

As will be understood by the skilled person, the above embodiment of an ultrasonic diagnostic imaging system is intended to give a non-limiting example of such an ultrasonic diagnostic imaging system. The skilled person will immediately realize that several variations in the architecture of the ultrasonic diagnostic imaging system are feasible without departing from the teachings of the present invention. For instance, as also indicated in the above embodiment, the micro-beamformer 412 and/or the Doppler processor 428 may be omitted, the ultrasound probe 410 may not have 3D imaging capabilities and so on. Other variations will be apparent to the skilled person.

The signal processing elements described above, including the voltage source 101, may all form part of the shared drive electronics so that effectively the overall system comprises the units shown in FIG. 7 (which are all known) but with multiple transducer arrays 410, and an additional selector as described above for selecting which transducer array 410 is operational at any time.

It will be understood that the present invention is not limited to an ultrasonic diagnostic imaging system. The teachings of the present invention are equally applicable to ultrasonic therapeutic systems in which the CMUT cells 100 may be operable in transmission mode only as there is no need to receive pulse echoes. As will be immediately apparent to the skilled person, in such therapeutic systems the system components described with the aid of FIG. 7 and required to receive, process and display pulse echoes may be omitted without departing from the teachings of the present application.

The description above relates to operation in collapsed mode, but the invention can be applied equally when the cells are operated in non-collapsed mode.

When applied to an imaging system, the invention is of interest for guidewire, catheter or needle tip tracking, and hence guided vascular access generally.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. An ultrasound system, comprising:
a set of ultrasound transducer devices, each device comprising an array of capacitive micro-machined ultrasound transducer (CMUT) cells, and each device comprising a first input for receiving a DC bias voltage and a second input for receiving an AC drive signal, wherein the set of ultrasound transducer devices are arranged adjacent to each other;
drive electronics for operating a selected device of the set of ultrasound transducer devices, wherein the drive electronics is shared between all devices of the set of ultrasound transducer devices, wherein the drive electronics comprises a first output for delivering the DC bias voltage and a second output for delivering the AC drive signal; and a selector comprising a circuit for generating a set of switching signals for selecting which device of the set of ultrasound transducer devices is coupled to the DC bias voltage, wherein the selector comprises a set of passive switches, with a respective passive switch between the first output of the drive electronics and the first input such that the DC bias voltage is coupled only to one selected device and the DC bias voltage is isolated from the non-selected devices of the set, wherein the same bias voltage is applied to each device of the set when the device is selected.

2. The system as claimed in claim 1, wherein the or each CMUT cell of each device is adapted to be operated in a collapsed mode.

3. The system as claimed in claim 1, wherein each device comprises a 2D array of CMUT cells, with at least 64 rows and at least 10 (ten) CMUT cells in each row.

4. The system as claimed in claim 1, wherein there are between 2 (two) ultrasound transducer devices and 10 (ten) ultrasound transducer devices.

5. The system as claimed in claim 1, wherein the or each CMUT cell of each device comprises:
 a substrate;
 a first electrode connected to the substrate formed around a central axis;
 a flexible membrane, wherein the flexible membrane is at least partially spatially separated from the first electrode; and
 a second electrode connected to the flexible membrane, wherein the second electrode is concentric with the first electrode.

6. The system as claimed in claim 5, wherein the drive electronics comprises:
 a voltage supply which is adapted to:
  provide the DC bias voltage to the first electrode; and
  provide the AC drive signal to the second electrode of the CMUT cell; and
 a capacitance sensing circuit.

7. The system as claimed in claim 1, comprising an imaging system.

8. The system as claimed in claim 7, wherein the imaging system is an interventional ultrasound imaging systems.

9. The system as claimed in claim 1, wherein each device is disposed on a separate substrate.

10. The system as claimed in claim 1, wherein the selector comprises a circuit adapted to generate a set of switching signals for a set of passive switches with a respective passive switch between the first output of the drive electronics and the first input of each device.

11. An ultrasound imaging method, comprising:
 selecting one ultrasound transducer device of a set of ultrasound transducer devices, each ultrasound transducer device comprising: an array of capacitive micromachined ultrasound transducer (CMUT) cells; and a first input for receiving a DC bias voltage and a second input for receiving an AC drive signal, wherein the set of ultrasound transducer devices are arranged adjacent to each other; and
 operating the selected device using drive electronics which delivers the DC bias voltage and the AC drive signal, wherein the selecting comprises switching the DC bias voltage only to one selected device and isolating the DC bias voltage from the non-selected devices of the set of ultrasound transducer devices using passive switches located between a first output of the drive electronics and the first input, and wherein the same bias voltage is applied to each device of the set of ultrasound transducer devices when the device is selected.

12. The method as claimed in claim 11, comprising operating the or each CMUT cell of each device in a collapsed mode.

13. The method as claimed in claim 11, wherein each device comprises a 2D array of CMUT cells, with at least 64 rows and at least ten CMUT cells in each row.

14. The method as claimed in claim 11, wherein there are between two ultrasound transducer devices and ten ultrasound transducer devices.

15. The method as claimed in claim 12, wherein each CMUT cell of each device comprises:
 a substrate;
 a first electrode connected to the substrate formed around a central axis;
 a flexible membrane, wherein the flexible membrane is at least partially spatially separated from the first electrode; and
 a second electrode connected to the flexible membrane, wherein the second electrode is concentric with the first electrode.

16. The method as claimed in claim 15, wherein the drive electronics comprises:
 a voltage supply which is adapted to:
  provide the DC bias voltage to the first electrode; and
  provide the AC drive signal to the second electrode of the CMUT cell; and
 a capacitance sensing circuit.

17. The method of claim 11, wherein each device is disposed on a separate substrate.

18. The method as claimed in claim 11, further comprising:
 generating a set of switching signals for a set of passive switches with a respective passive switch between a first output of the drive electronics and the first input of each device.

* * * * *